(12) United States Patent
Huang et al.

(10) Patent No.: US 11,091,618 B2
(45) Date of Patent: Aug. 17, 2021

(54) POLYPROPYLENE COMPOSITION

(71) Applicant: SABIC GLOBAL TECHNOLOGIES B.V., Bergen Op Zoom (NL)

(72) Inventors: Ting Huang, Pudong (CN); Yang Fu, Geleen (NL); Wesley Li, Pudong (CN); Maria Soliman, Geleen (NL); Yang Yang, Pudong (CN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 16/641,694

(22) PCT Filed: Aug. 30, 2018

(86) PCT No.: PCT/EP2018/073316
§ 371 (c)(1),
(2) Date: Feb. 25, 2020

(87) PCT Pub. No.: WO2019/043087
PCT Pub. Date: Mar. 7, 2019

(65) Prior Publication Data
US 2020/0224017 A1 Jul. 16, 2020

(30) Foreign Application Priority Data
Sep. 1, 2017 (EP) .................................. 17188980

(51) Int. Cl.
*C08L 23/14* (2006.01)
*C08J 3/00* (2006.01)

(52) U.S. Cl.
CPC ............... *C08L 23/14* (2013.01); *C08J 3/005* (2013.01); *C08J 2323/14* (2013.01); *C08J 2423/08* (2013.01); *C08L 2205/02* (2013.01); *C08L 2207/02* (2013.01)

(58) Field of Classification Search
CPC ...... C08L 23/04; C08L 23/08; C08L 23/0807; C08L 23/0815; C08L 23/10; C08L 23/12; C08L 23/14; C08L 23/142; C08L 2205/02; C08L 2205/025
See application file for complete search history.

(56) References Cited

U.S. PATENT DOCUMENTS

| | | | | |
|---|---|---|---|---|
| 2006/0058434 | A1* | 3/2006 | Watanabe | C08L 23/10 524/210 |
| 2016/0215176 | A1* | 7/2016 | Kanderski | B32B 27/08 |
| 2017/0335078 | A1* | 11/2017 | Defoer | B29C 71/04 |

FOREIGN PATENT DOCUMENTS

| | | |
|---|---|---|
| EP | 2586823 A1 | 5/2013 |
| WO | 2014044680 A1 | 3/2014 |
| WO | 2017025268 A1 | 2/2017 |

OTHER PUBLICATIONS

International Search Report; International Application No. PCT/EP2018/073316; International Filing Date: Aug. 30, 2018; dated Sep. 21, 2018; 2 pages.
Written Opinion; International Application No. PCT/EP2018/073316; International Filing Date: Aug. 30, 2018; dated Sep. 21, 2018; 5 pages.

* cited by examiner

*Primary Examiner* — Ana L. Woodward
(74) *Attorney, Agent, or Firm* — Cantor Colburn LLP

(57) ABSTRACT

The invention relates to a composition comprising: (A) a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms and (B) a copolymer of ethylene and α-olefin comonomer having 4 to 10 carbon atoms, wherein the elastomer has a density of 0.850 to 0.910 g/cm$^3$ and a melt flow rate of 15 to 50 dg/min measured in accordance with ISO1 133 using a 2.16 kg weight and at a temperature of 190° C., wherein the amount of (A) the propylene-based polymer is 60 to 99 wt % and the amount of (B) the copolymer is 1 to 40 wt %, with respect to the total composition.

19 Claims, No Drawings

POLYPROPYLENE COMPOSITION

CROSS REFERENCE TO RELATED APPLICATIONS

This application is a 371 of International Application No. PCT/EP2018/073316, filed Aug. 30, 2018, which is incorporated by reference in its entirety, and which claims priority to European Application Serial No. 17188980.1 filed Sep. 1, 2017.

The present invention relates to a polypropylene composition and an article comprising such polyolefin composition.

It is known in the art to modify the mechanical properties such as the impact resistance of polypropylene by adding a certain quantity of elastomeric olefin copolymer to the polypropylene.

One known application of polypropylene is its use as storage containers. Storage container applications require impact strength and some storage containers also require transparency. Storage containers also require a certain level of flexural modulus. Known storage containers based on polypropylene do not satisfy all of these requirements It is an objective of the present invention to provide a polypropylene composition in which the above-mentioned and/or other problems are solved.

Accordingly, the invention provides a composition comprising:
(A) a propylene-based polymer which is a propylene homopolymer or a propylene copolymer consisting of at least 90 wt % of propylene monomer units and at most 10 wt % of ethylene monomer units and/or an α-olefin monomer units having 4 to 10 carbon atoms and
(B) a copolymer of ethylene and α-olefin comonomer having 4 to 10 carbon atoms,
wherein the copolymer has a density of 0.850 to 0.910 g/cm$^3$ and a melt flow rate of 15 to 50 dg/min measured in accordance with ISO1133 using a 2.16 kg weight and at a temperature of 190° C.,
wherein the amount of (A) the propylene-based polymer is 60 to 99 wt % and the amount of (B) the copolymer is 1 to 40 wt %, with respect to the total composition.

According to the invention, a composition is provided which has a good combination of impact strength, transparency and flexural modulus.

(A) Propylene-Based Polymer

The composition according to the invention comprises (A) a propylene-based polymer. The propylene-based polymer may be a propylene homopolymer or a propylene copolymer with at most 10 wt % of comonomer units. The comonomer units may be ethylene monomer units and/or an α-olefin monomer units having 4 to 10 carbon atoms.

Preferably, the propylene-based polymer (A) is a random propylene-ethylene copolymer consisting of 90 to 99 wt % of propylene monomer units and 1 to 10 wt % of ethylene monomer units. More preferably, the propylene-based polymer (A) is a random propylene-ethylene copolymer consisting of 96 to 99 wt % of propylene monomer units and 1 to 4 wt % of ethylene monomer units. A random copolymer with a low comonomer content retains a good stiffness and leads to a good mechanical property balance.

Preferably, the propylene-based polymer (A) has a melt flow rate of 10 to 100 dg/min, for example 15 to 80 dg/min or 20 to 50 dg/min, as measured according to ISO1133 (2.16 kg, 230° C.).

Preferably, the propylene-based polymer (A) has a xylene soluble content at 25° C. of 4 to 10 wt %.

The amount of the propylene-based polymer (A) in the composition is 60 to 99 wt %, for example 70 to 98 wt % or 80 to 97 wt %, or 85 to 96 wt %, with respect to the total composition (100 wt %).

It will be appreciated that the propylene-based polymer (A), which is a propylene homopolymer or a random propylene copolymer with at most 10 wt % of comonomer units, is not a heterophasic propylene copolymer, also known as impact propylene copolymer or propylene block copolymer. Heterophasic propylene copolymers are generally prepared in two or more than two reactors in series, by polymerization of propylene (or propylene and α-olefin) in the presence of a catalyst and subsequent polymerization of an ethylene-α-olefin mixture. The resulting polymeric materials consist of a propylene-based matrix and a dispersed ethylene-α-olefin copolymer. Heterophasic propylene copolymers are described e.g. in WO2014044680. Such heterophasic propylene copolymer is not understood as a random propylene copolymer wherein the comonomer is randomly distributed throughout the copolymer, since in a heterophasic propylene copolymer the non-propylene comonomer amount is generally different between the matrix phase and the dispersed phase (the dispersed phase is an ethylene copolymer and therefore has a higher ethylene content than the matrix phase).

For the avoidance of any doubt, the propylene-based polymer (A) of the present invention is not a heterophasic propylene copolymer consisting of a propylene-based matrix and a dispersed ethylene-α-olefin copolymer. The composition according to the invention comprises little or no amount of a heterophasic propylene copolymer, e.g. at most 5 wt %, at most 3 wt %, at most 1 wt % or 0 wt % with respect to the total composition.

The use of the propylene-based polymer (A), which is a propylene homopolymer or a random propylene copolymer, is more advantageous than the use of a heterophasic propylene copolymer with respect to the optical performance, specifically with a lower haze.

(B) Copolymer of Ethylene and an α-Olefin Having 4 to 10 Carbon Atoms

The composition according to the invention comprises (B) a copolymer of ethylene and an α-olefin having 4 to 10 carbon atoms. The copolymer (B) is an elastomer. Preferably, the copolymer (B) is a copolymer of ethylene and 1-octene. Advantageously, a copolymer of ethylene and 1-octene provides a larger improvement in the impact strength of the composition according to the invention compared e.g. to a copolymer of ethylene and 1-butene having a similar MFR and a similar amount of the comonomer.

The copolymer (B) has a density of 0.850 to 0.910 g/cm$^3$. Preferably, the density of the copolymer (B) is 0.865 to 0.910 g/cm$^3$, for example 0.865 to 0.875 g/cm$^3$ or 0.875 to 0.910 g/cm$^3$.

The copolymer (B) has a melt flow rate of 15 to 50 dg/min, for example 15 to 20 dg/min or 20 to 50 dg/min, measured in accordance with ISO1133 using a 2.16 kg weight and at a temperature of 190° C.

It was observed that the higher MFR (melt flow rate) of the elastomer leads to a higher transparency and impact strength of the composition while the stiffness decreases. A higher density of the ethylene elastomer leads to a higher stiffness and a higher transparency of the composition while the impact strength decreases. The ethylene elastomer used in the present invention has an MFR range and a density range which leads to the combination of favorable impact strength, transparency and flexural modulus.

In some embodiments, the melt flow rate of the copolymer (B) is 20 to 50 dg/min and the density of the copolymer (B) is 0.865 to 0.875 g/cm3. This results in the composition having a very high impact strength while having an acceptable level of transparency and an acceptable level of flexural modulus.

In some embodiments, the melt flow rate of the copolymer (B) is 20 to 50 dg/min and the density of the copolymer (B) is 0.875 to 0.910 g/cm3. This results in the composition having a very high transparency and a very high flexural modulus while having an acceptable level of impact strength.

In some embodiments, the melt flow rate of the copolymer (B) is 15 to 20 dg/min and the density of the copolymer (B) is 0.865 to 0.910 g/cm3, for example 0.875 to 0.910 g/cm3. This results in the composition having a high impact strength, a high transparency and a high flexural modulus.

The amount of the copolymer (B) in the composition is 1 to 40 wt %, for example 2 to 30 wt %, 3 to 20 wt %, or 4 to 15 wt %, with respect to the total composition (100 wt %).

Preferably, the total of (A) and (B) is at least 90 wt %, at least 95 wt %, at least 98 wt %, at least 99 wt %, at least 99.5 wt %, at least 99.9 wt % or 100 wt % of the total composition.

Additives (C)

The composition may further comprise (C) optional components different from the propylene-based polymer (A) and the copolymer of ethylene and α-olefin comonomer (B), such as additives, wherein the total of (A), (B) and (C) is 100 wt % of the total composition. Accordingly, the invention relates to a composition consisting of (A), (B) and (C) optional components different from (A) and (B), such as additives.

The additives may include nucleating agents, stabilizers, e.g. heat stabilizers, anti-oxidants, UV stabilizers; colorants, like pigments and dyes; clarifiers; surface tension modifiers; lubricants; flame-retardants; mold-release agents; flow improving agents; plasticizers; anti-static agents; blowing agents; and/or components that enhance interfacial bonding between polymer and filler, such as a maleated polypropylene. The skilled person can readily select any suitable combination of additives and additive amounts without undue experimentation. The amount of the additives depends on their type and function and typically is of from 0 to about 10 wt %. The amount of the additives may e.g. be from about 1 to about 10 wt %; from about 2 to about 10 wt % or of from 3 to about 5 wt % based on the total composition.

Process

The composition of the invention may be obtained by a process comprising melt-mixing component (A) and component (B) and optionally component (C) by using any suitable means. Accordingly, the invention further relates to a process for the preparation of the composition according to the invention comprising melt mixing component (A), component (B) and optionally component (C). The melt-mixing step may be preceded by dry-mixing of the components (A) and (B). This is especially preferred when the melt-mixing is performed by injection molding.

Preferably, the composition of the invention is made in a form that allows easy processing into a shaped article in a subsequent step, like in pellet or granular form. Preferably, the composition of the invention is in pellet or granular form as obtained by mixing all components in an apparatus like an extruder; the advantage being a composition with homogeneous and well-defined concentrations of the additives.

With melt-mixing is meant that the component (B) and optionally component (C) are mixed with the component (A) at a temperature that exceeds the melting point of the component (A). Melt-mixing may be done using techniques known to the skilled person, for example in an extruder. Generally, in the process of the invention, melt-mixing is performed at a temperature in the range of 200 to 260° C.

Suitable conditions for melt-mixing, such as temperature, pressure, amount of shear, screw speed and screw design when an extruder is used are known to the skilled person.

Further Aspects

The invention further relates to an article, preferably a storage container, prepared from the composition according to the invention.

The invention further relates to use of the composition according to the invention for a storage container.

The composition according to the invention may be processed by any conventional technique known in the art into an article. Suitable examples of processing techniques wherein the composition according to the invention may be used include injection moulding, injection blow moulding, injection stretch blow moulding, rotational moulding, compression moulding, extrusion, extrusion compression moulding, extrusion blow moulding, sheet extrusion, film extrusion, cast film extrusion, foam extrusion, thermoforming and thin-walled injection moulding.

For the avoidance of doubt, in the present disclosure:
ISO1133 means ISO1133-1:2011.
ISO180 means ISO180:2000.
ASTM D1003A means ASTM D1003-13, procedure A.
ISO178 means ISO 178:2010.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXPERIMENTS

Random Propylene-Ethylene Copolymer

Random propylene-ethylene copolymer was used having a melt flow rate of 23 dg/min measured according to ISO 1133 using a 2.16 kg weight and at a temperature of 230° C., a density of 0.905 g/cm$^3$ and a C2 content of 3.6 wt %.

Elastomer

Copolymers of ethylene and 1-octene (POE1-7) and a propylene-based plastomer (POP1) as shown in Table 1 were used. The MFR shown below was measured according to ISO 1133 using a 2.16 kg weight and at a temperature of 190° C.

TABLE 1

| Elastomer | MFR @ 190° C. | Density (g/cm³) |
|---|---|---|
| POE1 | 0.5 | 0.868 |
| POE2 | 1 | 0.857 |
| POE3 | 5 | 0.87 |
| POE4 | 13 | 0.864 |
| POE5 | 30 | 0.87 |
| POE6 | 18 | 0.88 |
| POE7 | 30 | 0.902 |
| POP1 | 9 | 0.873 |

The random propylene-ethylene copolymer and the ethylene-1-octene copolymer or the propylene-based plastomer were dry blended and injection molded and the properties of the compositions were measured as summarized in Tables 2-4. The amount of the ethylene-1-octene copolymer or the propylene-based plastomer in the composition was 5 wt %, 8 wt % and 10 wt % in Tables 2-4, respectively. The rest was the random propylene-ethylene copolymer.

The measurements of the properties of the compositions were performed as follows:
MFR was measured according to ISO 1133 using a 2.16 kg weight and at a temperature of 230° C.
Izod impact strength was measured according to ISO 180 at 23° C.
Haze and Transmittance were measured by ASTM D1003A at 23° C.
Flexural modulus was measured according to ISO 178 at room temperature with a cross-head speed of 2 mm/min.

TABLE 2

| | | 5 wt % elastomer | | |
|---|---|---|---|---|
| | | MFR (dg/min) | transparency (%) | impact strength (KJ/m²) | flexural modulus (MPa) |
| CEx 0 | none | 23.21 | 77.6 | 5.03 | 1102 |
| CEx 1 | POE1 | 21.98 | 34.4 | 3.75 | 1022 |
| CEx 2 | POE2 | 22.89 | 18.9 | 4.2 | 1050 |
| CEx 3 | POE3 | 23.5 | 65.6 | 5.47 | 1038 |
| CEx 4 | POE4 | 23.81 | 67 | 6.05 | 999.6 |
| Ex 5 | POE5 | 24.22 | 70.1 | 6.42 | 998 |
| Ex 6 | POE6 | 23.52 | 74 | 5.69 | 1064 |
| Ex 7 | POE7 | 26.7 | 78.9 | 5.25 | 1090.42 |
| CEx 8 | POP1 | 23.41 | 78.3 | 5.25 | 956.6 |

TABLE 3

| | | 8 wt % elastomer | | | |
|---|---|---|---|---|---|
| | | MFR (dg/min) | transparency (%) | impact strength (KJ/m²) | flexural modulus (MPa) |
| CEx 0 | none | 23.21 | 77.6 | 5.03 | 1102 |
| CEx 9 | POE1 | 21.45 | 21.4 | 3.82 | 982.6 |
| CEx 10 | POE2 | 22.44 | 6.2 | 4.15 | 1046 |
| CEx 11 | POE3 | 22.71 | 57.9 | 6.15 | 1020.4 |
| CEx 12 | POE4 | 24.27 | 57.6 | 7.06 | 978.2 |
| Ex 13 | POE5 | 24.62 | 65 | 7.39 | 963.8 |
| Ex 14 | POE6 | 24.19 | 73.1 | 6.42 | 1074 |
| Ex 15 | POE7 | 26.51 | 77.2 | 5.57 | 1082 |
| CEx 16 | POP1 | 23.88 | 78 | 5.97 | 859.8 |

TABLE 4

| | | 10 wt % elastomer | | | |
|---|---|---|---|---|---|
| | | MFR (dg/min) | transparency (%) | impact strength (KJ/m²) | flexural modulus (MPa) |
| CEx 0 | POE1 | 21.89 | 77.6 | 5.03 | 1102 |
| CEx 17 | POE2 | 22.02 | 13 | 3.97 | 948.8 |
| CEx 18 | POE3 | 22.35 | 2.9 | 4.37 | 994.6 |
| CEx 19 | POE4 | 23.6 | 52.5 | 6.87 | 940.6 |
| CEx 20 | POE5 | 24.7 | 50.3 | 7.35 | 917.6 |
| Ex 21 | POE6 | 25.18 | 63.4 | 7.79 | 906 |
| Ex 22 | POE7 | 26.65 | 71.2 | 7.27 | 1028 |
| Ex 23 | POP1 | 24.11 | 76.4 | 5.63 | 1055.04 |
| CEx 24 | POE1 | 23.88 | 78.2 | 6.45 | 825.8 |

In CEx 1-4; 9-12; 17-20 using elastomers with low MFR, the transparency is not at an acceptable level although the impact strength and the flexural modlus are high in some cases.

In CEx 8, 16, 24 using POP, the flexural modulus is not at an acceptable level although the transparency and the impact strength are high.

In Ex 5-7; 13-15; 21-23 using elastomers with high MFR, the transparency and the flexural modulus are maintained at a high level similar to the composition without an elastomer (CEx 0), while the impact strength at room temperature is increased.

In Ex 5, 13, 21 using an elastomer with a particularly high MFR and a medium density, the largest increase in the impact strength is obtained.

In Ex 6, 14, 22 using an elastomer with a high MFR and a medium density, a good increase in the impact strength is obtained while the decrease in the trasnparency and stiffness is moderate.

In Ex 7, 15, 23 using an elastomer with a particularly high MFR and a relatively high density, the increase in the impact strength is moderate but the transparency and stiffness are maintained at very high level.

The invention claimed is:

1. A composition comprising:
   (A) a propylene-based polymer which is a random propylene-ethylene copolymer consisting of 90 to 99 wt % of propylene monomer units and 1 to 10 wt % of ethylene monomer units, and
   (B) an elastomer of ethylene and α-olefin comonomer having 4 to 10 carbon atoms, wherein the elastomer has a density of 0.850 to 0.910 g/cm³ and a melt flow rate of 15 to 50 dg/min measured in accordance with ISO1133 using a 2.16 kg weight and at a temperature of 190° C.,
   wherein the amount of (A) the propylene-based polymer is 60 to 99 wt % and the amount of (B) the elastomer is 1 to 40 wt %, with respect to the total composition,
   wherein the propylene-based polymer (A) has a melt flow rate of at least 20 dg/min as measured according to ISO1133 (2.16 kg, 230° C.), and
   wherein the composition comprises at most 5 wt % of a heterophasic propylene copolymer consisting of a propylene-based matrix and a dispersed ethylene-α-olefin copolymer with respect to the total composition.

2. The composition according to claim 1, wherein the melt flow rate of the copolymer (B) is 20 to 50 dg/min.

3. The composition according to claim 2, wherein the density of the copolymer (B) is 0.865 to 0.910 g/cm³.

4. The composition according to claim 3, wherein the density of the copolymer (B) is 0.865 to 0.875 g/cm³.

5. The composition according to claim 3, wherein the density of the copolymer (B) is 0.875 to 0.910 g/cm³.

6. The composition according to claim 1, wherein the melt flow rate of the copolymer (B) is 15 to 20 dg/min, and optionally wherein the density of the copolymer (B) is 0.865 to 0.910 g/cm³.

7. The composition according to claim 1, wherein the copolymer (B) is an elastomer of ethylene and 1-octene.

8. The composition according to claim 1, wherein the amount of the propylene-based polymer (A) is 80 to 99 wt % and the amount of the copolymer (B) is 1 to 20 wt %, with respect to the total composition.

9. The composition according to claim 1, wherein the propylene-based polymer has a melt flow rate of 2010 to 100 dg/min, measured in accordance with ISO1133 using a 2.16 kg weight and at a temperature of 230° C.

10. The composition according to claim 1, wherein the propylene-based polymer (A) is a random propylene-ethylene copolymer consisting of 96 to 99 wt % of propylene monomer units and 1 to 4 wt % of ethylene monomer units.

11. The composition according to claim 1, wherein the propylene-based polymer (A) is not a heterophasic propylene copolymer consisting of a propylene-based matrix and a dispersed ethylene-α-olefin copolymer.

12. A process for the preparation of the composition according to claim 1, comprising melt-mixing the propylene-based polymer (A) and the copolymer (B), optionally preceded by dry-blending of (A) and (B).

13. An article comprising the composition according to claim 1.

14. The article according to claim 13, wherein the article is a storage container.

15. The composition according to claim 1,
wherein the amount of the propylene-based polymer (A) is 80 to 99 wt % and the amount of the copolymer (B) is 1 to 20 wt %, with respect to the total composition;
wherein the propylene-based polymer (A) is a random propylene-ethylene copolymer consisting of 96 to 99 wt % of propylene monomer units and 1 to 4 wt % of ethylene monomer units.

16. The composition of claim 1, wherein
(A) the random propylene-ethylene copolymer consists of 96 to 99 wt % of propylene monomer units and 1 to 4 wt % of ethylene monomer units, and does not include a heterophasic propylene copolymer consisting of a propylene-based matrix and a dispersed ethylene-α-olefin copolymer, and
(B) the elastomer of ethylene and α-olefin comonomer has 4 to 10 carbon atoms, wherein the elastomer has a density of 0.865 to 0.875 g/cm³ and a melt flow rate of 15 to 20 dg/min measured in accordance with ISO1133 using a 2.16 kg weight and at a temperature of 190° C.

17. The composition according to claim 1, wherein the composition comprises at most 3 wt % of a heterophasic propylene copolymer consisting of a propylene-based matrix and a dispersed ethylene-α-olefin copolymer with respect to the total composition.

18. The composition according to claim 1, wherein the composition comprises 0 wt % of a heterophasic propylene copolymer consisting of a propylene-based matrix and a dispersed ethylene-α-olefin copolymer with respect to the total composition.

19. A composition comprising:
(A) a propylene-based polymer which is a random propylene copolymer consisting of 96 to 99 wt % of propylene monomer units and 1 to 4 wt % of ethylene monomer units and/or an α-olefin monomer units having 4 to 10 carbon atoms, and
(B) an elastomer of ethylene and α-olefin comonomer having 4 to 10 carbon atoms, wherein the elastomer has a density of 0.865 to 0.875 g/cm³ and a melt flow rate of 15 to 20 dg/min measured in accordance with ISO1133 using a 2.16 kg weight and at a temperature of 190° C.,
wherein the amount of (A) the propylene-based polymer is 60 to 99 wt % and the amount of (B) the elastomer is 1 to 40 wt %, with respect to the total composition,
wherein the propylene-based polymer (A) has a melt flow rate of at least 20 dg/min as measured according to ISO1133 (2.16 kg, 230° C.), and
wherein the composition comprises at most 5 wt % of a heterophasic propylene copolymer consisting of a propylene-based matrix and a dispersed ethylene-α-olefin copolymer with respect to the total composition.

* * * * *